(12) United States Patent
Kim et al.

(10) Patent No.: US 7,483,233 B2
(45) Date of Patent: Jan. 27, 2009

(54) METHOD AND APPARATUS FOR DRIVING VCM UNLOADING HDD HEAD

(75) Inventors: Cheol-soon Kim, Anyang-si (KR); Sang-min Suh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 93 days.

(21) Appl. No.: 11/637,009

(22) Filed: Dec. 12, 2006

(65) Prior Publication Data

US 2007/0133119 A1 Jun. 14, 2007

(30) Foreign Application Priority Data

Dec. 14, 2005 (KR) ................... 10-2005-0123159

(51) Int. Cl.
G11B 5/54 (2006.01)
G11B 21/12 (2006.01)

(52) U.S. Cl. ...................................................... 360/75
(58) Field of Classification Search ................. None
See application file for complete search history.

(56) References Cited

U.S. PATENT DOCUMENTS 6,081,400 A * 6/2000 Lu et al. ................. 360/75
6,490,116 B1 * 12/2002 Watanabe et al. ......... 360/75
6,567,232 B1 * 5/2003 Klaassen .................. 360/75
6,754,027 B2 * 6/2004 Hirano et al. ............. 360/75
6,765,746 B2 * 7/2004 Kusumoto ................ 360/75
6,920,007 B2 * 7/2005 Tominaga et al. ......... 360/75
7,072,135 B2 * 7/2006 Suzuki ..................... 360/75
7,133,242 B2 * 11/2006 Fujii et al. ................ 360/75
7,196,863 B2 * 3/2007 Sakamoto ................ 360/75
7,352,523 B2 * 4/2008 Tan et al. ................. 360/75
2001/0024339 A1 * 9/2001 Yaegashi .................. 360/75

FOREIGN PATENT DOCUMENTS

| JP | 2001-143228 | 5/2001 |
| JP | 2001-266514 | 9/2001 |
| JP | 2002-208238 | 7/2002 |
| JP | 2004-095009 | 3/2004 |

* cited by examiner

Primary Examiner—Hoa T Nguyen
Assistant Examiner—James L Habermehl
(74) Attorney, Agent, or Firm—Volentine & Whitt, PLLC

(57) ABSTRACT

Provided are a voice coil motor (VCM) driving method for an HDD, related head unloading apparatus and recording media suitable for implementing the driving method. The method of driving a VCM to park a head on a ramp in the HDD includes; driving the VCM using a first driving voltage until the head moves to a first position; and thereafter driving the VCM using a second driving voltage higher than the first driving voltage during a first time period sufficient cause the head to rise along a first incline of the ramp.

22 Claims, 6 Drawing Sheets

METHOD AND APPARATUS FOR DRIVING VCM UNLOADING HDD HEAD

BACKGROUND OF THE INVENTION

1. Field of the Invention

The present invention relates to hard disk drives. More particularly, the invention relates to a method and apparatus adapted to drive a voice coil motor in a HDD to unload a read/write head.

This application claims the benefit of Korean Patent Application No. 10-2005-0123159, filed on Dec. 14, 2005, the subject matter of which is hereby incorporated by reference.

2. Description of the Related Art

A hard disk drive (HDD) is a well known recording device used within many host devices and applications to store data. Information is typically recorded on concentric tracks of a magnetic disk housed within the HDD. The disk is mounted on and rotated by a spindle motor. As the disk rotates, data is accessed (e.g., written to and/or read from) on the HDD by positioning one or more read/write head(s). The head is commonly mounted to an actuator arm which is positioned using a voice coil motor (VCM). In conventional HDDs, a VCM rotates an actuator arm in response to an applied VCM driving current. In this manner, the head is across the disk and precisely positioned to access desired data.

The head reads data recorded upon the surface of the disk by sensing variations in a magnetic field defined by the electro-magnetic properties of the disk's surface. To record (or write) data on the disk, a write current is supplied to the head. In response to the applied write current, the head generates a magnetic field which may be used to selectively define (or re-define) the electromagnetic properties of the disk's surface. For example, data recorded on the disk may vary in its nature according to a magnetization property imparted to a selected portion of the surface of the disk.

Movement and positioning of the head is critical to the proper operation of the HDD. When not being used, the head is commonly "parked" in a position where it may safely rest. The process of positioning and parking the head within the HDD when no tin use is generally referred to as "unloading" the head. Unloading operations may vary is their respective natures, but all unloading operations effectively park the head.

The parking location for the head is commonly referred to as "the ramp". The term "ramp" has a historical basis wherein many early (as well as contemporary) parking locations for head are literally ramp structures. However, the term "ramp" should be broadly interrupted to denote any structure and related positioning adapted to receive an HDD head during an unloading operation. A head may be unloaded, for example, when power is interrupted to the HDD, when entering a power saving mode, when the HDD becomes idle, as the HDD is being turned OFF, or in circumstances where it is necessary to protect the head and/or the disk from an externally applied shock. For example, the HDD make detect a free-fall state and unload its head in anticipation of an impact as host device incorporating the HDD is dropped.

FIG. 1 is a schematic plan view of a conventional HDD 100 using one type of ramp structure. Referring to FIG. 1, HDD 100 includes at least one disk 12 rotated by a spindle motor 14. HDD 100 also includes at least one head 16 positioned relative to the surface of disk 12. Head 16 may read data from or write data to disk 12 as it rotates by sensing a magnetic field formed on the surface of disk 12 or by magnetizing the surface of disk 12. (For the sake of clarity only a single head will be described hereafter, bearing in mind that multiple read/write heads may be alternately used. For example, the single head 16 shown in FIG. 1 may comprise a write head for magnetizing disk 12 and a separate read head for sensing a magnetic field of the disk 12).

Head 16 may be assembled on a slider (not shown). The slider generates an air bearing between head 16 and the surface of disk 12. The slider may be combined with a suspension 20. Suspension 20 may be combined with a head stack assembly (HSA) 22. HSA 22 is attached to a VCM 30 through a mold structure 24 fixing a voice coil 26. Voice coil 26 is located adjacent to a magnetic assembly 28 specifying (supporting) VCM 30 together with voice coil 26. A VCM driving current supplied to voice coil 26 generates a driving force which rotates HSA 22 around a bearing assembly 32. The rotation of HSA 22 moves head 16 across the surface of disk 12.

When HDD 100 illustrated in FIG. 1 performs a head unloading operation, head 16 is positioned on a ramp 6 installed to the side of the outer circumference of disk 12.

FIG. 2 is a view for describing a conventional head unloading operation in relation to ramp 6. Referring to FIG. 2, when the head unloading operation is performed, head 16 is unloaded onto ramp 6 from disk 12.

FIG. 3 is a cross-sectional view of ramp 6 of FIG. 2. Ramp 6 has a cross section of a ladder shape and includes a first incline 6d, a flat surface 6c, a second incline 6b, and a safety zone 6a. Referring to FIG. 3, when the head unloading operation is performed, head 16 rises along first incline 6d until it lands within safety zone 6a. In actual practice, a projection 20a extending from suspension 20 to which head 16 is attached typically makes contact with ramp 6 when head 16 is positioned in safety zone 6a.

To ensure reliable execution of the head unloading operation, the mechanical driving force provided by VCM 30 must be sufficient to safely land head 16 on ramp 6. If the driving force provided by VCM 30 is not sufficient, head 16 will not be able to rise over first incline 6d and reach the safety zone 6a. In such circumstances, heed 16 lands may come to rest on disk 12, thereby damaging head 16 and/or disk 12.

Conventionally, this potential problem has been addressed by increasing the driving force of VCM 30 by some margin that ensures reliable execution of the head unloading operation. This increase in driving force may be accomplished by increasing a torque constant associated with VCM 30 and/or increasing the driving current applied to VCM 30.

However, increasing the torque constant for VCM 30 also tends to increase its overall size (generally its height profile). This outcome is not desirable in view of ongoing attempts to reduce the size of HDD 100.

In addition, if the driving current applied to VCM 30 is increased, the driving force imparted by VCM 30 will generally increase as well. This outcome may result in an excessively high rate of movement for head 16. If head 16 moves at too high a speed, mechanical vibrations may arise the negatively influence operation of head 16 and may damage disk 12.

SUMMARY OF THE INVENTION

Embodiments of the invention provide a method and apparatus adapted to more appropriately drive a VCM within a HDD. Such embodiments generally provide an increased VCM driving force—sufficient to ensure reliable execution of an unloading operation, while at the same time ensuring stable control over the movement speed of the head.

In one embodiment, the invention provides a method of driving a voice coil motor (VCM) to unload a head from a disk onto a ramp in a hard disk drive (HDD), the method comprising; driving the VCM using a first driving voltage until the head moves to a first position, and thereafter driving the VCM using a second driving voltage higher than the first driving voltage during a first time period sufficient cause the head to rise along a first incline of the ramp.

In another embodiment, the invention provides an apparatus for unloading a head from a disk onto a ramp in a hard disk drive (HDD) during an unloading operation, the apparatus comprising; a voice coil motor (VCM) adapted to move the head, a switch selecting between a first driving voltage and a second driving voltage higher than the first driving voltage, and applying the selected driving voltage to the VCM, and an unloading controller adapted to control the switch, such that upon initiation of the unloading operation, the VCM is driven by the first driving voltage until the head moves to a first position, and hereafter the VCM is driven by a second driving voltage higher than the first driving voltage during a first time period.

In another embodiment, the invention provides computer readable recording medium storing a computer readable program adapted in its execution to perform a method of driving a voice coil motor (VCM) in a Hard Disk Drive (HDD), the method comprising; driving the VCM using a first driving voltage until the head moves to a first position, and thereafter, driving the VCM using a second driving voltage higher than the first driving voltage during a first time period sufficient cause the head to rise along a first incline of the ramp.

DESCRIPTION OF EMBODIMENTS

The present invention will now be described in some additional detail with reference to the accompanying drawings. The illustrated embodiments are presented as teaching examples. The scope of the invention in not limited to only the illustrated examples.

Figure 1:
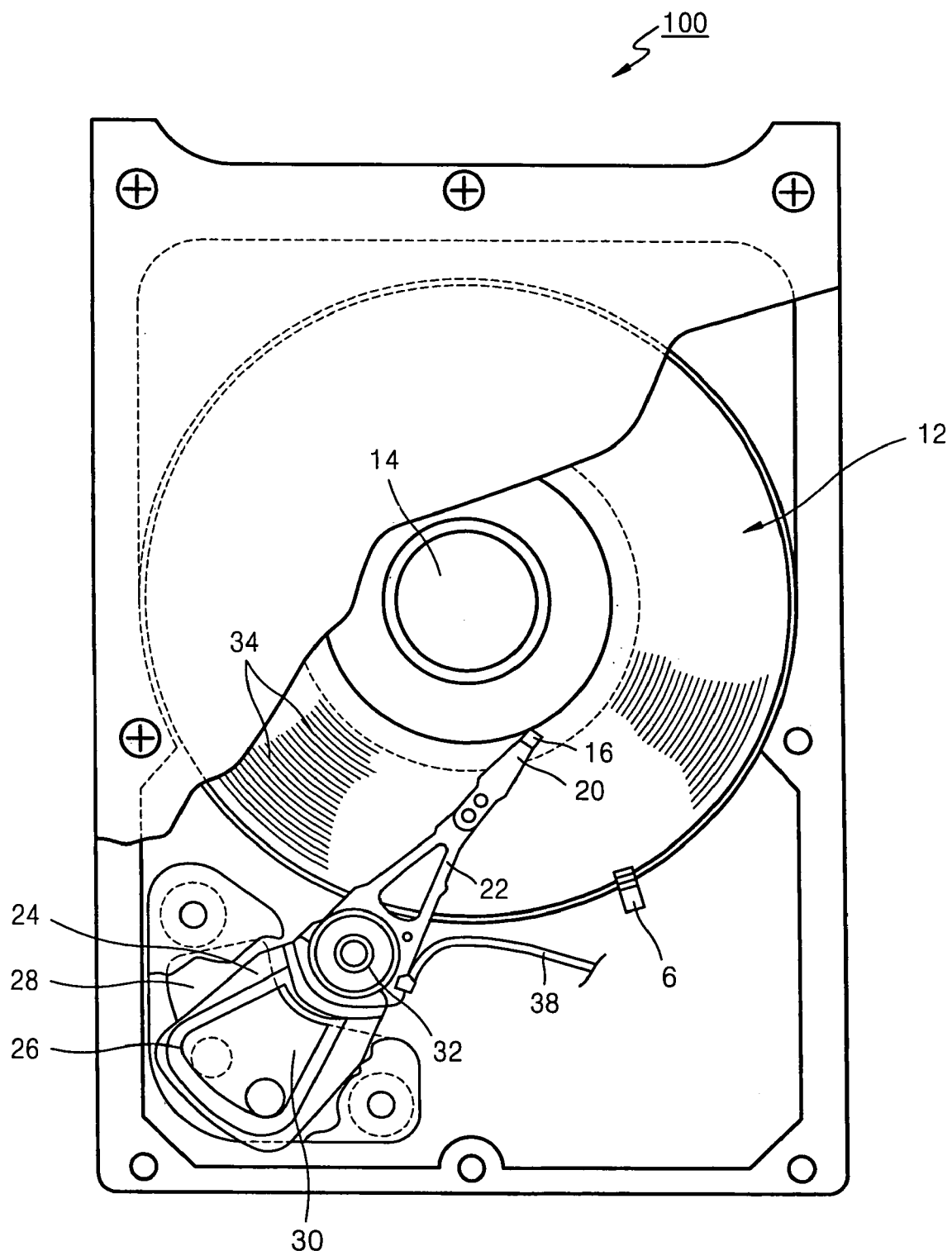
FIG. 1 is a schematic plan view of a conventional HDD incorporating a ramp structure.
Figure 2:
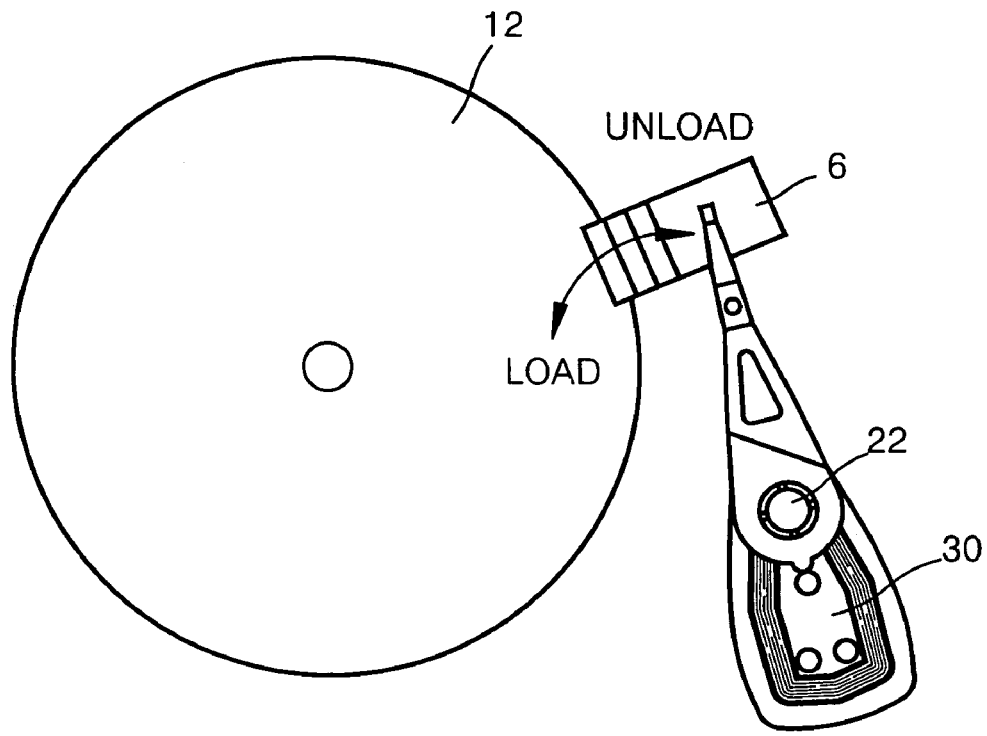
FIGS. 2 and 3 illustrate a conventional head unloading operation for the HDD of FIG. 1.
Figure 3:
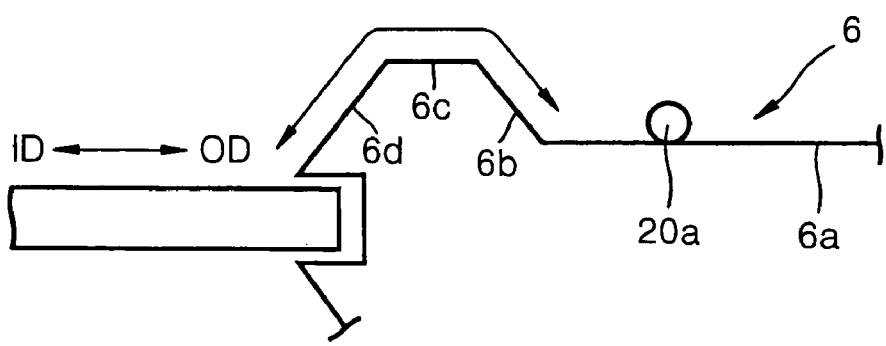
Figure 4:
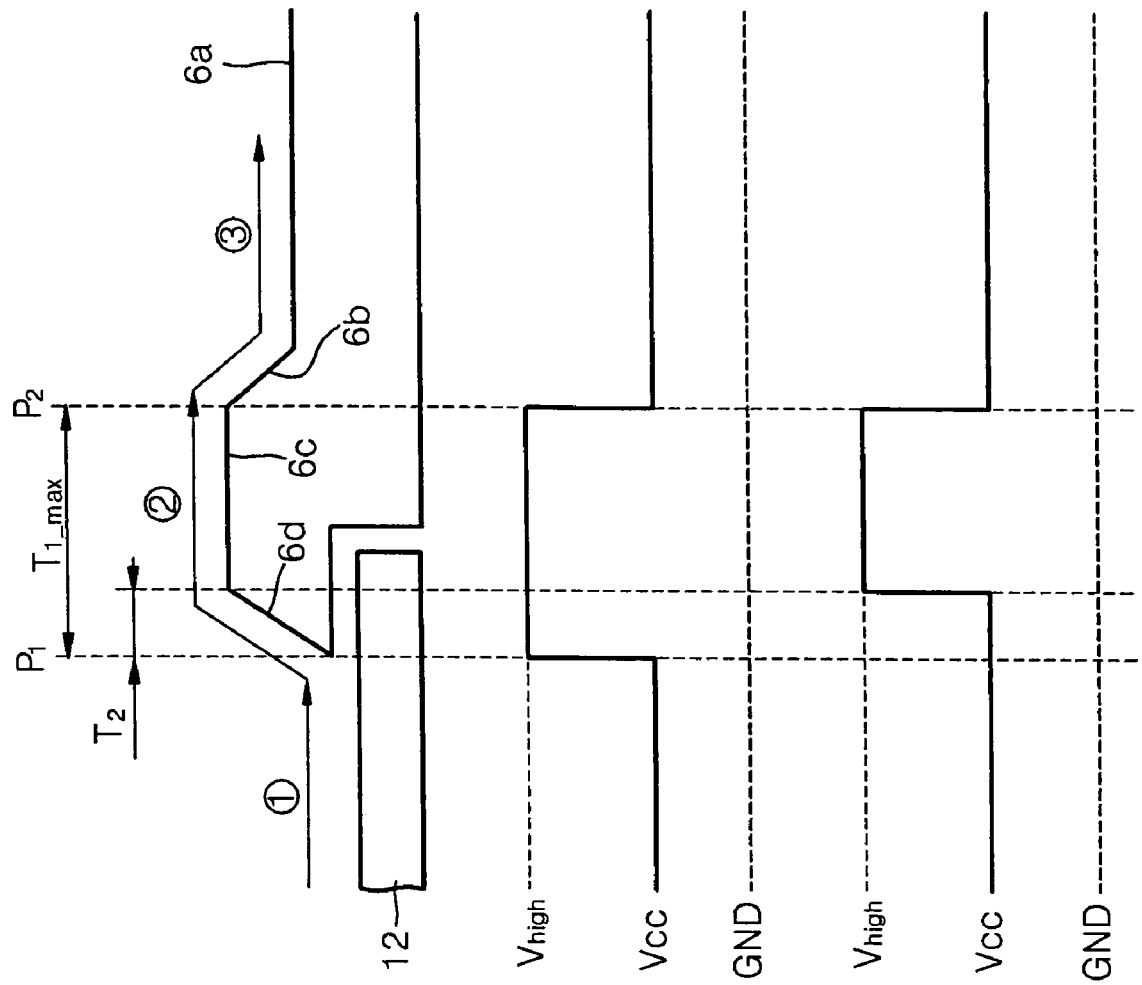
FIGS. 4A through 4C are waveform diagrams associated with a ramp structure diagram and illustrate a VCM driving method according to an embodiment of the invention.

FIG. 4A is a profile cross-section of an exemplary ramp structure. The following description is made relative to this ramp structure, but may be readily applied to other ramp structures. FIGS. 4B and 4C are voltage waveform diagrams illustrating a voice coil motor (VCM) driving method according to an embodiment of the invention.

Referring to FIG. 4A, head 16 moves to a first position P1 (inner ramp edge position) near ramp 6 at a controlled speed. Under the urging of associated mechanical parts (see above), head 16 then rises along a first incline 6d, crosses over a plateau surface 6c, descends along a second incline 6b, until it reaches a safety zone 6a.

FIG. 4B shows a VCM driving voltage according to an embodiment of the present invention. Referring to FIG. 4B, a VCM associated with head 16 is driven by a first driving voltage (Vcc), e.g., a normal driving voltage for the VCM until head 16 moves to the first position P1. The VCM is then driven by a second driving voltage (Vhigh) higher than the first driving voltage (Vcc) during a first time period (T1). The second driving voltage may be derived, e.g., from a charged voltage source. Under the influence of the second driving voltage (Vhigh), head 16 is substantially driven over first incline 6d and plateau surface 6c of ramp 6.

The first time period (T1) has an associated maximum value (T1_max) which is defined as the time necessary for head 16 to rise up first incline 6d, cross over plateau surface 6c and arrive at a second position P2 (outer ramp edge position). This means that the first time period T1 may vary within a range defined by maximum value (T1_max). This also means that the beginning and ending points for the positioning of head 16 during the first time period T1 may vary between the first and second positions, P1 and P2.

The beginning point for the first time period T1 may vary because head 16 can rise along first incline 6d to a certain level under the influence of the driving force imparted by the VCM has even after head 16 arrives at the first position P1. In addition, the ending point for the first time period T1 may vary because the point at which the first driving voltage (Vcc) is again applied to the VCM at the conclusion of the first time period T1 may vary as head 16 is parked in safety zone 6a.

FIG. 4C shows a comparative case relative to the case illustrated in FIG. 4B in which the application of the second driving voltage (Vhigh) to the VCM is delayed. Referring to FIG. 4C, the VCM is not only driven by the first driving voltage (Vcc) to the point where head 16 moves into the first position P1, but also thereafter as head 16 rises up first incline 6d (e.g., for an additional (second) time period T2). The VCM is then driven by the second driving voltage (Vhigh) following the second time period T2.

Figure 5:
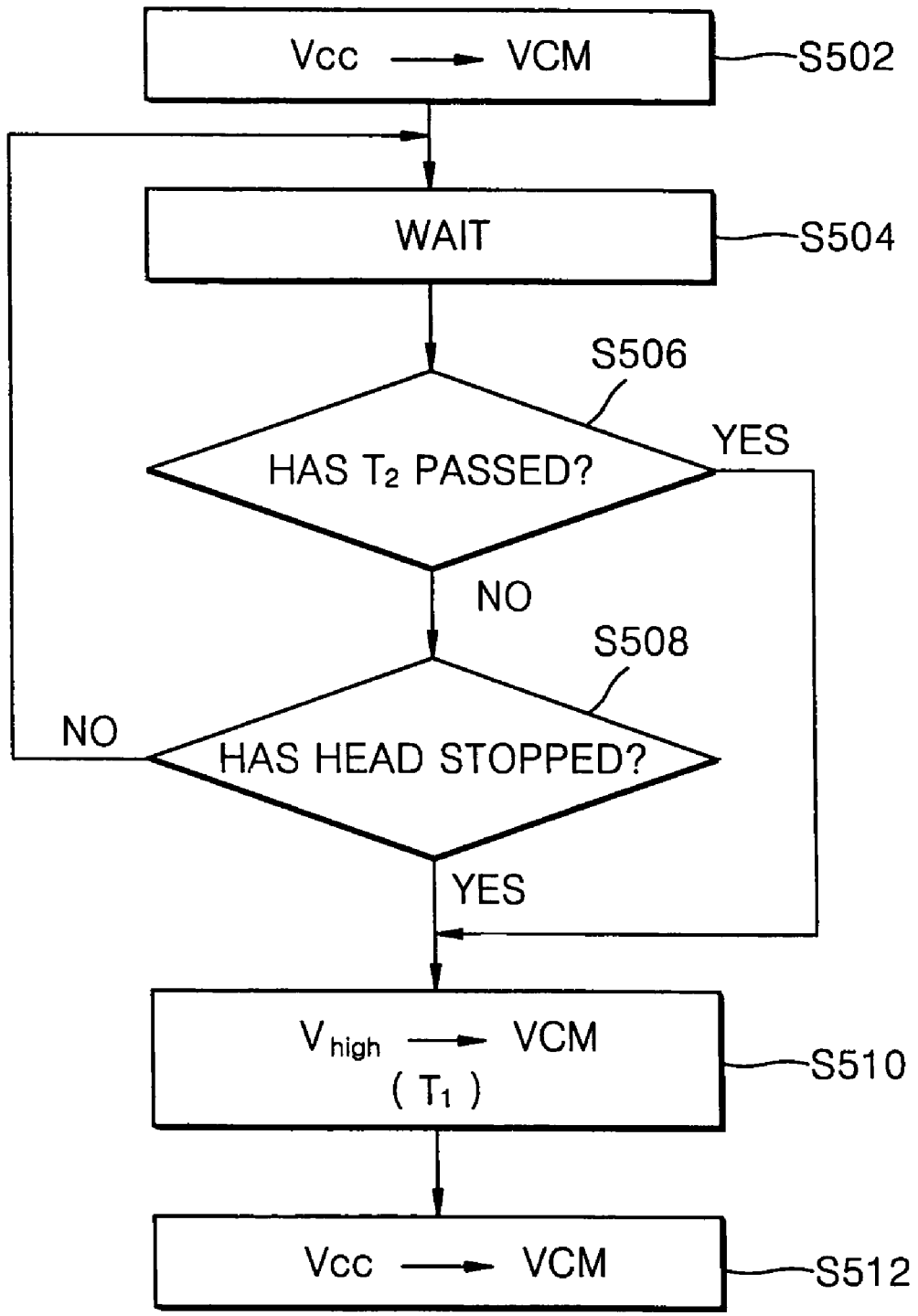
FIG. 5 is a flowchart illustrating the VCM driving method according to an embodiment of the invention.

FIG. 5 is a flowchart illustrating a VCM driving method according to an embodiment of the present invention. Referring to FIG. 5, when a head unloading operation starts, (S502), head 16 moves into the first position P1 under the influence of the first driving voltage (Vcc), as applied to the VCM. While head 16 moves to the first position P1, its movement speed may be precisely and readily controlled, as is conventionally understood. By retaining the use of the first driving voltage (Vcc) to this point in the unloading operation, the risk of an accidental impact between head 16 and ramp 6 is greatly reduced, as compared to a case where head 16 of driven to the first position by an over voltage significantly higher than Vcc.

As illustrated example shown in FIG. 4A, since first incline 6d of ramp 6 protrudes a little above disk 12, when projection 20a of suspension 20 contacts and begins to rise along first incline 6d, head 16 begins to separate from disk 12. As a result of this separation, head 16 is no longer in a position to read servo data recorded on disk 12. So, in one embodiment, the location of first position P1 may be accurately determined by the detecting a loss of servo information being read by head 16. In another embodiment, wherein first incline 6d of ramp 6 is located outside the circumference of disk 12, the location of first position P1 may be accurately determined by detecting the outer physical edge of disk 12 or an outermost recording track or some other track proximate the edge of disk 12.

The movement speed of head 16 may be determined and controlled in response to servo information read by head 16. In one embodiment, a conventional controller (not shown) may be used to determine the movement speed of head 16 by sampling track position information recorded in servo sectors using head 16 and comparing track position information from one sampling period to track position information from another sampling period. Such track position comparison information may be used as a feedback signal to control the movement speed of head 16 by, for example, adjusting the amplitude of the driving current applied to the VCM.

When head 16 arrives at first position P1 (S504), it enters a wait state during which the first driving voltage (Vcc) is applied to the VCM. During the wait state (S504), head 16 may rise a little along first incline 6d of ramp 6 due to driving force exerted by the VCM. In some embodiments, pausing in a wait state need not be performed.

Next, it is determined whether the second time period T2 has elapsed (S506). If the second time period T2 has elapsed, the control method applies the second driving voltage (Vhigh) to the VCM (S510); otherwise a determination is made as to whether head 16 has stopped (S508). For example, if head 16 rises along first incline 6d of ramp 6, it cannot read servo information recorded on disk 12. Thus, whether or not head 16 is stopped may be determined in relation to a counter electromotive force associated with the VCM. If the counter electromotive force of the VCM is "0", it may be reliably determined that head 16 has stopped. Thus, if head 16 stops during the second time period T2, the second driving voltage (Vhigh) is immediately applied to the VCM without waiting for the end of the second time period T2 so that head 16 may rise along first incline 6d of ramp 6.

As noted above, however, if the second time period T2 has elapsed, the VCM is driven by the second driving voltage (Vhigh) during the first time period T1. The greater driving force associated with the second driving voltage (Vhigh) enables head 16 to rise along first incline 6d of ramp 6. Following the first time period T1, the first driving voltage Vcc is again applied to the VCM so that head 16 may be parked in safety zone 6a of ramp 6 (S512).

Figure 6:
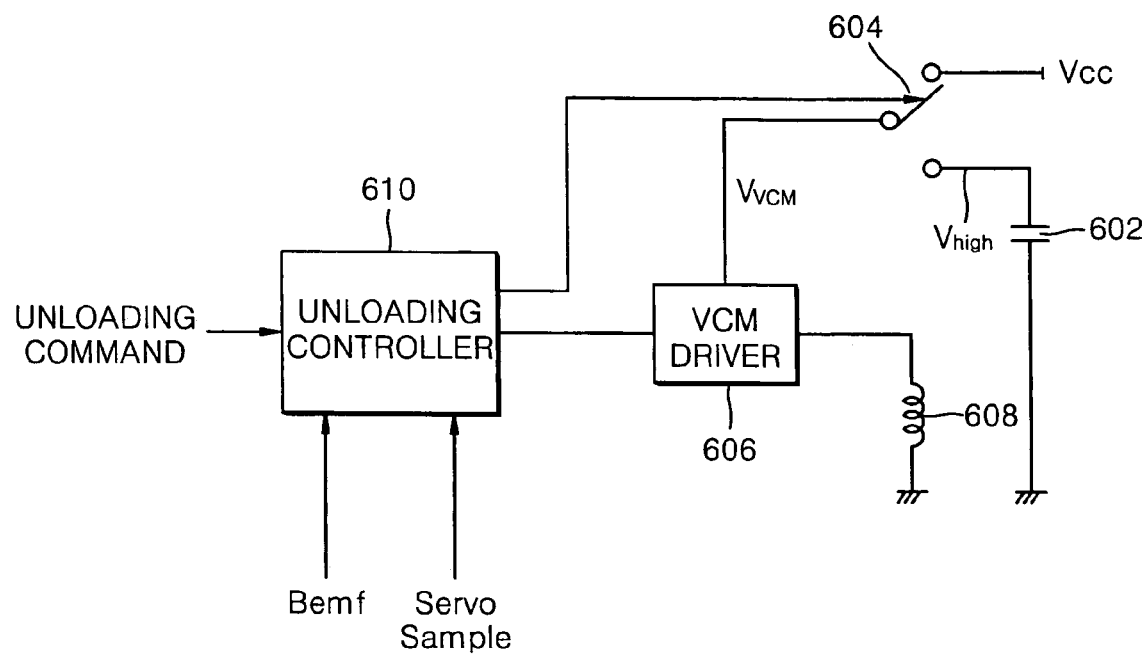
FIG. 6 is a block diagram of a head unloading apparatus according to an embodiment of the invention.

FIG. 6 is a block diagram of a head unloading apparatus according to an embodiment of the invention. Referring to FIG. 6, the head unloading apparatus includes a condenser 602 adapted to generate the second driving voltage (Vhigh). In one embodiment, condenser 602 is charged by a driving voltage source within the HDD to generate the second driving voltage (Vhigh) higher than the first driving voltage (Vcc). The head unloading apparatus also includes a switch 604 adapted to select either the first driving voltage (Vcc) or the second driving voltage (Vhigh) and provide the selected voltage as a driving voltage source (Vvcm) to VCM driver 606. The head unloading apparatus also includes a VCM 60 and unloading controller 610 adapted to control the head unloading operation. For example, the unloading controller 610 may initiate a head unloading operation in response to a received unloading command. When the head unloading operation begins, unloading controller 610 controls a VCM driving current applied to VCM 608 through VCM driver 606 by referring to servo samples so that head 16 arrives at the first position P1 at a well-controlled constant speed.

Once head 16 arrives at the first position P1, unloading controller 610 controls switch 604 so that the second driving voltage (Vhigh) is applied to VCM driver 606 instead of the first driving voltage (Vcc) during the first time period T1. Under the influence of the second driving voltage (Vhigh), head 16, which has already arrived at the first position P1, rises along first incline 6d of ramp 6.

In a case where head 16 waits during the second time period T2 after arriving at the first position P1, unloading controller 610 determines whether head 16 has stopped during the second time period T2, in relation, for example, to a counter electromotive force (Vemf) generated by VCM 608. If it is determined that head 16 has stopped, unloading controller 610 controls switch 604 so that the second driving voltage (Vhigh) is immediately applied to the VCM during the first time period T1 without waiting for the end of the second time period T2.

Figure 7:
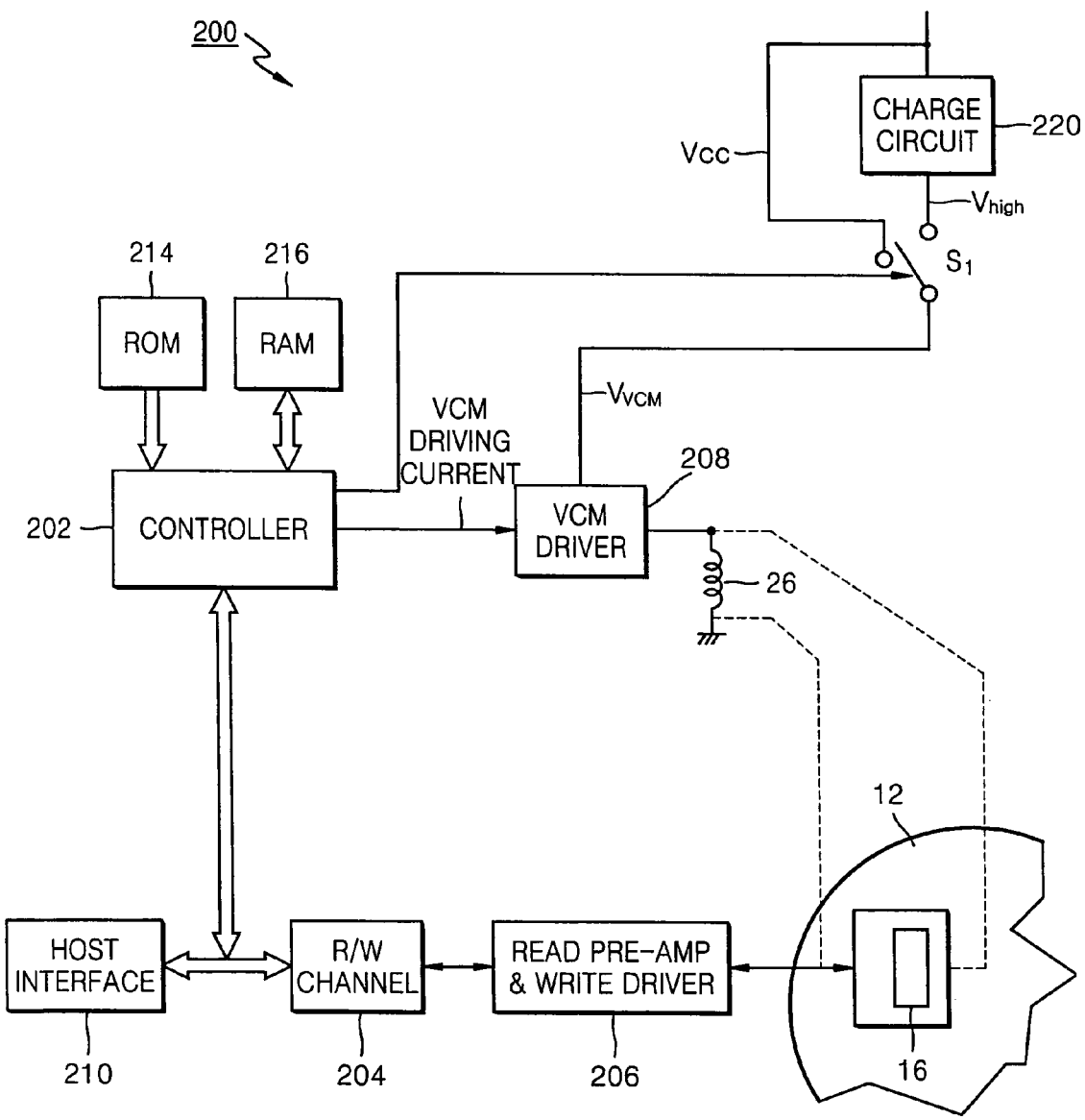
FIG. 7 is a block diagram of a control apparatus controlling an HDD using the VCM driving method, according to an embodiment of the invention.

FIG. 7 is a block diagram of a control apparatus 200 controlling a HDD using the VCM driving method of the present invention, according to an embodiment of the present invention.

Referring to FIG. 7, a control apparatus 200 includes a controller 202 connected to head 16 through a read/write (R/W) channel circuit 204, and a read pre-amplifier & write drive circuit 206. In the illustrated example, controller 202 corresponds to unloading controller 610 of FIG. 6 and may be implemented using a conventional digital signal processor (DSP), microprocessor, or micro-controller.

A charge circuit 220 may be used to generate the second driving voltage (Vhigh) by accumulating charge provided by a driving voltage source within the HDD. A switch S1 is provided to select between the first driving voltage (Vcc) and the second driving voltage (Vhigh) and apply same to a VCM driver 208.

Controller 202 provides a control signal to R/W channel circuit 204 to read data from or write to disk 12. Controller 202 also selectively provides the first driving voltage (Vcc) or the second driving voltage (Vhigh) generated by charge circuit 220 to VCM driver 208.

Information is typically transmitted from RAN channel circuit 204 to a host interface circuit 210. Host interface circuit 210 includes a control circuit (not shown) for interfacing with a host device (not shown), such as a personal computer (PC).

In a data read mode, R/W channel circuit 204 converts the analog signal provided by head 16 and amplified by read pre-amplifier & write drive circuit 206 into a host device compatible digital signal, and outputs the corresponding digital signal to host interface circuit 210. In a data write mode, R/W channel circuit 204 converts data received via host interface circuit 210 into a disk-recordable write current and outputs the corresponding write current to read pre-amplifier & write drive circuit 206.

Controller 202 is also connected to VCM driver 208 in order to supply a driving current to voice coil 26. Thus, controller 202 provides a control signal to VCM driver 208 to control activation of a VCM and movement of head 16.

Controller 202 is also connected to a nonvolatile memory, such as a read only memory (ROM) 214 or a flash memory, and a random access memory (RAM) 216. Memories 214 and 216 store instructions and data, which are used by controller 202 to execute applicable software routines. For example, the VCM driving method illustrated in FIG. 5 may be implemented as one or more software routines.

Controller 202 may perform a head unloading operation by controlling VCM driver 208 and switch S1 using a head unloading method, such as the one illustrated in FIG. 5. In view of the foregoing examples, controller 202 may precisely move head 16 to the first position P1 near ramp 6 at a well-controlled speed. Then, head 16 may be moved to rise along first incline 6d, cross plateau surface 6c, descend down second incline 6b, until it is parked in safety zone 6a.

Embodiments of the present invention may be realized, in whole or in part, as a control method, an apparatus, and/or a system. When an embodiment of the invention is realized in software, wholly or in part, one or more enabling components may be implemented as executable programming code. Such programming code may be stored in a processor readable recording medium and/or transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard disks, optical fiber media, and RF networks.

As described above, according to embodiments of the present invention, in a VCM driving method, reliability of a head unloading operation can be increased by selectively increasing the driving force applied to a VCM.

In addition, in a head unloading method, since a head does not have to move at an excessively high rate of speed during a head unloading operation, the possibility of the head being damaged due to shocks can be reduced.

While the present invention has been particularly shown and described with reference to exemplary embodiments thereof, it will be understood by those of ordinary skill in the art that various changes in form and detail may be made therein without departing from the scope of the present invention as defined by the following claims.

What is claimed is:

1. A method of driving a voice coil motor (VCM) to unload a head from a disk onto a ramp in a hard disk drive (HDD), the method comprising:
   driving the VCM using a first driving voltage until the head moves to a first position;
   driving the VCM using a second driving voltage higher than the first driving voltage during a first time period sufficient cause the head to rise along a first incline of the ramp; and
   parking the head in a safety zone of the ramp by again driving the VCM using the first driving voltage after the first time period elapses.

2. The method of claim 1, further comprising:
   waiting during at least part of a second time period once the head is moved to the first position.

3. The method of claim 2, further comprising:
   determining whether movement of the head has stopped during the second time period; and
   if the head has stopped during the second time, immediately driving the VCM using the second driving voltage.

4. The method of claim 3, wherein the determination of whether movement of the head has stopped during the second time period is made in relation to a counter electromotive force associated with the VCM.

5. The method of claim 1, wherein the first driving voltage is derived from a normal driving voltage source, and the second driving voltage is derived from a charge circuit.

6. The method of claim 1, wherein the head moves at a constant speed under the influence of the first driving voltage.

7. The method of claim 6, wherein the constant speed is determined and controlled in relation to servo information read from the disk by the head.

8. The method of claim 1, wherein the first position is a position wherein no servo information may be read by the head from the disk as head moves onto the ramp.

9. An apparatus for unloading a head from a disk onto a ramp in a hard disk drive (HDD) during an unloading operation, the apparatus comprising:
   a voice coil motor (VCM) adapted to move the head;
   a switch selecting between a first driving voltage and a second driving voltage higher than the first driving voltage, and applying the selected driving voltage to the VCM; and
   an unloading controller adapted to control the switch, such that upon initiation of the unloading operation, the VCM is driven by the first driving voltage until the head moves to a first position, the VCM is driven by a second driving voltage higher than the first driving voltage during a first time period, and thereafter the VCM is driven by the first driving voltage after the first time period elapses.

10. The apparatus of claim 9, wherein once the head arrives at the first position, the unloading controller is further adapted to place the head in a wait state for at least a portion of a second time period, before driving the VCM with the second driving voltage.

11. The apparatus of claim 10, wherein the unloading controller is further adapted to determine during the second time period whether the head has stopped, and if so, immediately drive the VCM with the second driving voltage.

12. The apparatus of claim 11, wherein the unloading controller is further adapted to determine whether the head has stopped during the second time in relation to a counter electromotive force associated with the VCM.

13. The apparatus of claim 9, wherein the first driving voltage is derived from a normal driving voltage source, and the second driving voltage is derived from a charge circuit.

14. The apparatus of claim 9, wherein the first position is a position wherein no servo information may be read by the head from the disk as head moves onto the ramp.

15. A method of driving a voice coil motor (VCM) to unload a head from a disk onto a ramp in a hard disk drive (HDD), the method comprising:
   driving the VCM using a first driving voltage until the head moves to a first position;
   waiting once the head has moved to the first position, and thereafter driving the VCM using a second driving voltage higher than the first driving voltage during a first time period sufficient to move the head up a ramp incline and across a ramp plateau adjoining the first incline.

16. The method of claim 15, wherein a second time period is defined as a period of time necessary for the head to move from the first position up the ramp incline to the ramp plateau, and the method further comprises:
   determining whether movement of the head has stopped during the second time period; and
   if the head has stopped during the second time, immediately driving the VCM using the second driving voltage.

17. The method of claim 16, wherein the determination of whether movement of the head has stopped during the second time period is made in relation to a counter electromotive force associated with the VCM.

18. The method of claim 15, wherein the first driving voltage is derived from a normal driving voltage source, and the second driving voltage is derived from a charge circuit.

19. A method of driving a voice coil motor (VCM) to unload a head from a disk onto a ramp in a hard disk drive (HDD), the method comprising:
   driving the VCM using a first driving voltage until the head moves to a first position, wherein the head moves at a constant speed under the influence of the first driving voltage and the constant speed is determined and controlled in relation to servo information read from the disk by the head; and thereafter,
   driving the VCM using a second driving voltage higher than the first driving voltage during a first time period sufficient to move the head up a ramp incline and across a ramp plateau adjoining the first incline.

20. A method of driving a voice coil motor (VCM) to unload a head from a disk onto a ramp in a hard disk drive (HDD), the method comprising:

driving the VCM using a first driving voltage until the head moves to a first position; and thereafter, driving the VCM using a second driving voltage higher than the first driving voltage during a first time period sufficient to move the head up a ramp incline and across a ramp plateau adjoining the first incline, wherein the first position is a position wherein no servo information may be read by the head from the disk as head moves onto the ramp incline.

21. The method of claim 20, wherein a second time period is defined as a period of time necessary for the head to move from the first position up the ramp incline to the ramp plateau, and the method further comprises:

determining whether movement of the head has stopped during the second time period; and if the head has stopped during the second time, immediately driving the VCM using the second driving voltage.

22. The method of claim 21, wherein the determination of whether movement of the head has stopped during the second time period is made in relation to a counter electromotive force associated with the VCM.

* * * * *